United States Statutory Invention Registration [19]

[11] Reg. Number: H458

Turner, Jr. et al. [43] Published: Apr. 5, 1988

[54] PRESSURE-REDUCING SPRAY NOZZLE AND USE THEREOF IN A FROTH FLOTATION METHOD

[75] Inventors: Robert F. Turner, Jr., Turnersville, N.J.; Bruce C. Stouch, Swarthmore, Pa.

[73] Assignee: The Standard Oil Company, Cleveland, Ohio

[21] Appl. No.: 913,069

[22] Filed: Sep. 29, 1986

[51] Int. Cl.[4] ..... B03D 1/02; B03D 1/14

[52] U.S. Cl. ..... 209/164; 209/166; 209/168

[56] References Cited

U.S. PATENT DOCUMENTS

| | | |
|---|---|---|
| 2,712,962 | 7/1955 | Goddard . |
| 3,811,620 | 5/1974 | Gebhardt . |
| 4,239,424 | 12/1980 | Pavolka . |
| 4,347,126 | 8/1982 | McGarry et al. . |
| 4,347,127 | 8/1982 | Duttera et al. . |
| 4,350,302 | 9/1982 | Gruber et al. . |
| 4,514,291 | 4/1985 | McGarry et al. . |
| 4,529,337 | 7/1985 | Hilgraf et al. . |

*Primary Examiner*—John F. Terapane
*Assistant Examiner*—Eric Jorgensen
*Attorney, Agent, or Firm*—Bruce E. Harang; David J. Untener; Larry W. Evans

[57] ABSTRACT

An improved spray apparatus for the froth flotation of a liquid-solid slurry, e.g., water-containing coal particulate, is disclosed. The initially high velocity of a spray of the slurry prior to its contacting the surface of liquid in a froth flotation cell is significantly reduced through a double deflection arrangement associated with the spray nozzle. This reduction in the velocity of the spray results in a more efficient froth flotation process.

22 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRESSURE-REDUCING SPRAY NOZZLE AND USE THEREOF IN A FROTH FLOTATION METHOD

BACKGROUND OF THE INVENTION

The present invention relates generally to an apparatus and method for flotation separation of mineral particles including coal and similar materials, and more particularly pertains to an improved apparatus and method for beneficiating coal by flotation separation of a froth generated by a pressure-reducing spray nozzle such that ground coal particles may be separated from impurities associated therewith such as ash and sulfur.

Coal is an extremely valuable natural resource in the United States because of its relatively abundant supplies. It has been estimated that the United States has more energy available in the form of coal than in the combined natural resources of petroleum, natural gas, oil shale, and tar sands. Recent energy shortages, together with the availability of abundant coal reserves and the continuing uncertainties regarding the availability of crude oil, have made it imperative that improved methods be developed for converting coal into a more useful energy source.

Many known prior art processes for froth flotation separation of a slurry of particulate matter are based on constructions wherein air is introduced into the liquid slurry of particulate matter, as through a porous cell bottom or a hollow impeller shaft, thereby producing a surface froth. These prior art methods are relatively inefficient approaches, especially when large amounts of particular matter are being processed. Generally, these techniques are inefficient in providing sufficient contact between the particulate matter and the frothing air. As a result, they require relatively large amounts of energy to generate the froth. In addition, froth flotation techniques which permit bubbles to rise in the slurry can tend to trap and carry impurities such as ash in the froth slurry, and accordingly the resultant beneficiated particulate product frequently has more impurities therein than desired.

Methods have been suggested and are being explored in the beneficiation of coal, i.e., the cleaning of coal of impurities such as ash and sulfur, either prior to burning the coal or after its combustion. In one recently developed technique for beneficiation, termed herein chemical surface treating, raw coal is pulverized to a fine mesh size and is then chemically treated. According to this technique, the treated coal is then separated from ash and sulfur, and a beneficiated or cleaned coal product is recovered therefrom. In further detail, in the heretofore mentioned chemical surface treating process, coal is first cleaned of rock and the like, and is then pulverized to a fine size of about 48 to 300 mesh. The extended surfaces of the ground coal particles are then rendered hydrophobic and oleophilic by a polymerization reaction. The sulfur and mineral ash impurities present in the coal remain hydrophilic and are separated from the treated coal product in a water washing step. This step utilizes oil and water separation techniques and results in hydrophobic coal particles floating upon a water phase which contains hydrophilic impurities.

In greater detail, commonly assigned McGarry et al. U.S. Pat. No. 4,347,126 and Duttera et al. U.S. Pat. No. 4,347,127 disclose the flotation separation of coal particles from impurities associated therewith such as ash and sulfur. In these arrangements, a primary spray hollow jet nozzle is positioned above a flotation tank having a water bath therein, and sprays an input slurry through an aeration zone into the surface of the water. The spraying operation creates a froth on the water surface in which a substantial quantity of particular matter floats while other components of the slurry sink into the water bath. A skimming arrangement skims the froth from the water surface as a cleaned, or beneficiated, product. A recycling operation is also provided wherein particulate materials which do not float after being sprayed through the primary spray nozzle are recycled to a further recycle, hollow jet spray nozzle to provide a second opportunity for recovery of the recycled particles.

Commonly assigned McGarry et al. U.S. Pat. No. 4,514,291 and copending McGarry et al. U.S. patent application Ser. No. 707,664 filed Mar. 4, 1985 disclose an improved spiral spray nozzle which does much to overcome problems associated with the full jet spray nozzle described in aforesaid U.S. Pat. Nos. 4,347,126 and 4,347,127. The full jet nozzle is characterized by a multiplicity of small apertures which results in the development of a substantial back pressure across each nozzle during its operation. Several problems have arisen with this particular nozzle design, including a recurring problem with clogging. Tank covers, filter systems, larger nozzles and extreme care and frequent cleaning are necessary to alleviate this problem. The improved open spiral nozzle of U.S. Pat. No. 4,514,291 and copending Ser. No. 707,664 which represents a significant improvement over the aforesaid full jet nozzle is available from several different manufacturers in many different types of materials including polypropylene and tungsten carbides.

A variety of arrangements for deflecting or distributing particulate material, liquids, slurries, suspensions, and the like, are known, e.g., from U.S. Pat. Nos. 2,525,025; 2,639,947; 2,712,962; 2,713,895; 3,811,620; 4,239,424; 4,350,302 and 4,529,337. However, none are known to have been provided for a spray unit utilized in a froth flotation procedure such as described in aforesaid U.S. Pat. Nos. 3,347,126 and 4,347,127.

SUMMARY OF THE INVENTION

It is an object of the present invention to provide an improved apparatus and method for froth flotation of a slurry of particulate matter employing an improved type of spray nozzle.

It is a particular object of the invention to provide a spray nozzle for a froth flotation process provided with means for doubly deflecting the spray thereby effecting a significant reduction in its velocity.

It is another object of this invention to provide such a spray nozzle further featuring means for introducing air or other gas into an aqueous coal slurry as part of a method for beneficiating an aqueous coal slurry by froth flotation separation of coal particles from impurities contained therein.

A further object of the subject invention is the provision of an improved apparatus and method for producing aeration in a flotation tank to generate a froth of particulate material such as carbonaceous particles, non-carbonaceous particles, or mixtures of both, coal particles, mine tailings, oil shale, residuals, waste particulates, mineral dressings, graphite, mineral ores, fines, etc.

Still another object of the invention is to provide an apparatus and method for froth flotation separation which results in a more efficient operation than prior art procedures.

These and other objects of the invention are achieved by the spray apparatus herein which comprises:

(a) a nozzle through which a liquid-solid slurry is discharged under pressure;

(b) a first surface for intercepting and initially deflecting the path of nozzle discharge incident thereon; and, (c) a second surface for intercepting and redeflecting initially deflected nozzle discharge incident thereon.

The foregoing spray apparatus is especially well suited for use in the method for the froth flotation separation of the components of a liquid-solid slurry which comprises:

(a) discharging a liquid-solid slurry under pressure through a nozzle upon the surface of a liquid forming a froth thereon, said nozzle being provided with a first surface for intercepting and initially deflecting the path of nozzle discharge incident thereon and a second surface for intercepting and redeflecting initially deflected nozzle discharge incident thereon whereby the velocity of the nozzle discharge is significantly reduced; and, (b) removing froth from the liquid surface.

The foregoing apparatus and method are especially advantageous for cleaning, or beneficiating, coal and/or other carbonaceous particles. Unlike the nozzles employed in known froth flotation coal beneficiation procedures such as those referred to above, the double deflecting spray apparatus of the present invention provides a substantial reduction in the velocity of the aqueous coal slurry. When employed in the froth flotation method of this invention, the surface velocity of the liquid-solid slurry is significantly decreased while the flotation and forward motion of the subsequently formed froth is significantly increased compared to, say, the flotational and velocity characteristics of a froth produced by the spray nozzle arrangements described in the prior coal beneficiation processes discussed above.

BRIEF DESCRIPTION OF THE DRAWINGS

The foregoing spray apparatus and froth flotation method may be more readily understood by reference to the drawings in which.

DETAILED DESCRIPTION OF THE INVENTION

Figure 1:
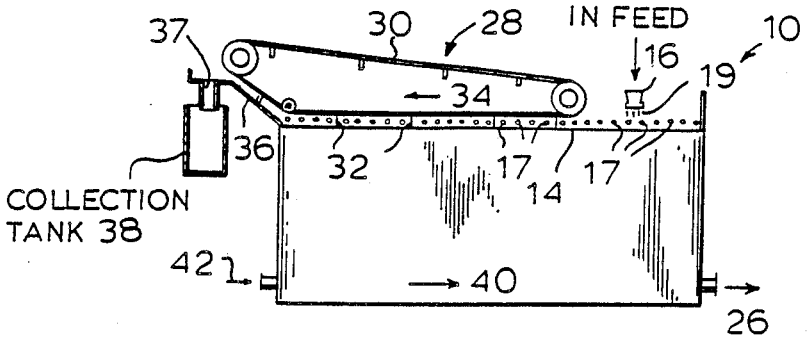
FIG. 1 is a schematic view of a froth flotation system in accordance with the teachings of the present invention; and, FIG. 2 is a schematic of a double deflecting spray apparatus in accordance with the teachings of the present invention.

The double deflecting spray apparatus and method of the present invention are adapted to the separation of a wide variety of solid-fluid streams by the creation of a solids-containing froth phase, and are suitable for the separation of many types of particulate matter. However, the present invention is described herein with specific application to a coal beneficiating operation.

It is preferred to employ a coal-aqueous slurry having a coal to water ratio of from about 1:25 to about 1:2 and preferably from about 1:20 to about 1:5 parts by weight, especially one in which the coal component has been previously beneficiated. Any of the known and conventional beneficiation procedures and apparatus are suitable, e.g., the beneficiation systems described in U.S. Pat. Nos. 4,304,573; 4,332,593; 4,347,126; 4,347,127; 4,406,664; and 4,412,843, the disclosures of which are incorporated by reference herein. In particular, in accordance with the beneficiation system described in aforesaid U.S. Pat. No. 4,412,843, coal or other carbonaceous material, generally of a particle size of from about −10 to less than about 500 mesh, preferably with about 80% of the particles being of −200 mesh in size (Taylor Standard Screen Size), is admixed in an aqueous medium with a surface treating mixture comprising a polymerizable monomer, a polymerization catalyst and a liquid organic carrier thereby rendering the coal hydrophobic and oleophilic. The thus-beneficiated hydrophobic and oleophilic coal particles float to the surface of the liquid mass while the ash, still remaining hydrophilic, tends to settle and is removed to the water phase. The beneficiated coal particles in the form of a froth are recovered, e.g., by a skimming screen, and are thereafter optionally subjected to at least one further wash step.

The beneficiation process of U.S. Pat. No. 4,412,843 can employ any polymerizable monomer, preferably one which is ethylenically unsaturated such as ethylene, propylene, butylene, tetrapropylene, isoprene, butadiene, pentadiene, dicyclopentadiene, octadiene, olefinic petroleum fractions, styrene, vinyltoluene, vinylchloride, acrylonitride, methacylonitrile, acrylamide, methacrylamide, N-methylolacrylamide, acrolein, maleic acid, maleic anhydride, fumaric acid, abietic acid, and the like. Unsaturated carboxylic acids constitute an especially preferred class of polymerizable monomers and include fatty acids such as oleic acid, linoleic acid, linolenic acid, ricinoleic acid, mono-, di- and tri-glycerides and other esters of unsaturated fatty acids, acrylic acid, methacrylic acid, methylacrylate, ethylacrylate, ethylhexylacrylate, tertiarybutylacrylate, oleylacrylate, methylmethacrylate, oleylmethacrylate, stearylacrylate, stearylmethacrylate, laurylmethacrylate vinylacetate, vinylstearate, vinylmyristate, vinyllaurate, unsaturated vegetable seed oil, soybean oil, rosin acids, dehydrated castor oil, linseed oil, olive oil, peanut oil, tall oil, corn oil, and the like, with corn oil providing especially good results. The amount of polymerizable monomer will vary depending upon the degree of surface treatment desired. In general, however, monomer amounts of from about 0.005 to about 0.1% by weight of the dry coal are used.

The catalysts employed in the foregoing coal surface treating beneficiation reaction are any such materials commonly used in polymerization reactions. These include, for example, anionic, cationic or free radical catalysts. Free radical catalysts or catalyst systems (also referred to as addition polymerization catalysts, vinyl polymerization catalysts or polymerization initiators) are preferred. Such catalysts include, for example, inorganic and organic peroxides such as benzoyl peroxide, methylethyl ketone peroxide, tert-butyl-hydroperoxide, hydrogen peroxide, ammonium persulfate, di-tertbutylperoxide, tert-butyl-perbenzoate, peracetic acid and include such non-peroxy free-radical initiators as the diazo compounds such as 1,1'-bisazoisobutyronitrile, and the like. Typically, any catalytic amount (e.g., 1 pound per ton of dry coal feed) of the foregoing described catalysts can be used.

The liquid organic carrier utilized in the beneficiation process of U.S. Pat. No. 4,412,843 includes, for example, fuel oil (which is preferred), other hydrocarbons including benzene, toluene, xylene, hydrocarbons fractions such as naphtha and medium boiling petroleum fractions (boiling point 100°-180° C.), dimethylformamide, tetrahydrofuran, tetrahydrofurfuryl alcohol, dimethylsulfoxide, methanol, ethanol, isopropyl alcohol, acetone, methylethyl ketone, ethyl acetate, and the like, and mixtures thereof. The amounts of liquid organic carrier employed are generally in the range of from about 0.25 to about 5% by weight based on the weight of dry coal.

The surface treatment reaction is carried out in an aqueous medium with the amount of water generally ranging from about 65% to about 95% by weight based on the weight of coal slurry. In general, any polymerization conditions which result in the formation of a hydrophobic or oleophilic surface on the coal can be utilized. More specifically, typical reaction conditions include, for example, temperatures in the range of from about 10° C. to about 90° C., pressures ranging from atmospheric to nearly atmospheric and contact times, i.e., reaction times, of from about 1 second to about 30 minutes, preferably from about 1 second to about 3 minutes. Preferably, the surface treatment reaction is carried out at a temperature of from about 15° C. to about 80° C. at atmospheric pressure for about 2 minutes. In general, however, the longer the reaction time, the better the results. The coal can be contacted with the surface treating ingredients in various ways. In one procedure, an aqueous pulverized coal slurry is fed through the double deflecting spraying means herein, and the surface treating ingredients, i.e., polymerizable monomer, polymerization catalyst, initiator and liquid organic carrier, are added to the aqueous coal spray. The resultant total spray mixture is then introduced to an aqueous medium contained in a beneficiation vessel. In another procedure, the aqueous coal slurry and surface treating ingredients, i.e., polymerizable monomer, polymerization catalyst, initiator and liquid organic carrier, are admixed in a premix tank and the resultant admixture is sprayed into an aqueous medium contained in a beneficiation vessel. In yet another procedure the resultant surface treated aqueous coal mixture, formed in the beneficiation vessel in accordance with the second mentioned procedure, is recycled to the same vessel by re-feeding the mixture to the vessel through at least one of said spraying means.

Referring now, to FIG. 1 illustrating a first embodiment 10 of the present invention, a flotation tank 12 is filled with water to level 14. In operation, a slurry of finely ground coal particles, associated impurities, and if desired additional additives such as monomeric chemical initiators, chemical catalysts and fluid hydrocarbons referred to above is sprayed through at least one nozzle shown generally at 16 positioned at a spaced distance above the water level in tank 12. In alternative embodiments, two or more nozzles can be used to spray slurry and/or any other desired ingredients into the tank.

The stream of treated coal is pumped under pressure through a manifold to spray apparatus 16 wherein the resultant shearing forces spray the coal flocculent slurry as fine droplets such that they are forcefully jetted into the mass of a continuous water bath in tank 12 to form a froth 17. High shearing forces are created in nozzle 16, and the dispersed particles forcefully enter the surface of the water and break up the coal-oil-water flocs, thereby water-wetting and releasing ash from the interstices between the coal flocs and breaking up the coal flocs so that exposed ash surfaces introduced into the water are separated from the floating coal particles and sink into the water bath. The surfaces of the finely divided coal particles now contain entrained air much of which is entrapped by spraying the slurry through an aeration zone 19 such that air is sorbed into the sprayed slurry. The combined effects on the treated coal cause the flocculated coal to decrease in apparent density and to float as a froth 17 on the surface of the water bath. The hydrophilic ash remains in the bulk water phase, and tends to settle downwardly in tank 12 under the influence of gravity. Tank 12 in FIG. 1 may be a conventional froth flotation tank commercially available from KOM-LINE-Sanderson Engineering Co., Peapack, N.Y., modified as set forth below. The flotation tank can also include somewhat standard equipment which is not illustrated in the drawings, such as a liquid level sensor and control system, and a temperature sensing and control system.

The present invention operates on a froth generation principle in which the slurry is sprayed through an aeration zone such that substantially greater quantities of air are sorbed by the sprayed finer droplets of the slurry. Accordingly, air is introduced into the slurry in a unique manner to generate the resultant froth. The advantages of this manner of froth generation make the teachings herein particularly applicable to froth flotation separation of slurries which have a substantial proportion of particulate matter therein.

The particles in the floating froth created by nozzle 16 can be removed from the water surface by, e.g., a skimming arrangement 28 in which an endless conveyor belt 30 carries a plurality of spaced skimmer plates 32 depending therefrom. The skimmer plates are pivotally attached to the conveyor belt to pivot in two directions relative to the belt, and the bottom run of the belt is positioned above and parallel to the water surface in the tank. Plates 32 skim the resultant froth on the water surface in a first direction 34 toward a surface 36, preferably upwardly inclined, extending from the water surface to a collection tank 38 arranged at one side of the flotation tank, such that the skimmer plates 32 skim the froth from the water surface up the surface 36 and into the collection tank 38.

In the arrangement of the disclosed embodiment, the waste disposal at the bottom of the tank operates in a direction 40 flowing from an influent stream 42 to the effluent stream 26, while the skimmer arrangement at the top of the tank operates in direction 34 counter to that of the waste disposal arrangement. Although the illustrated embodiment shows a counterflow arrangement, alternative embodiments are contemplated within the scope of the present invention, e.g., cross and concurrent flows therein.

Although not described in detail herein, a recycling arrangement similar to those described in U.S. Pat. Nos. 4,347,126 and 4,345,127, supra, can also be utilized in association with the present invention wherein a recycling technique is employed to further improve the efficiency relative to prior art arrangements. In the recycling technique, coal particles which do not float after being sprayed through the spray nozzle 16 are recycled to a further recycle spray nozzle to provide the coal particles a second cycle for recovery.

Figure 2:
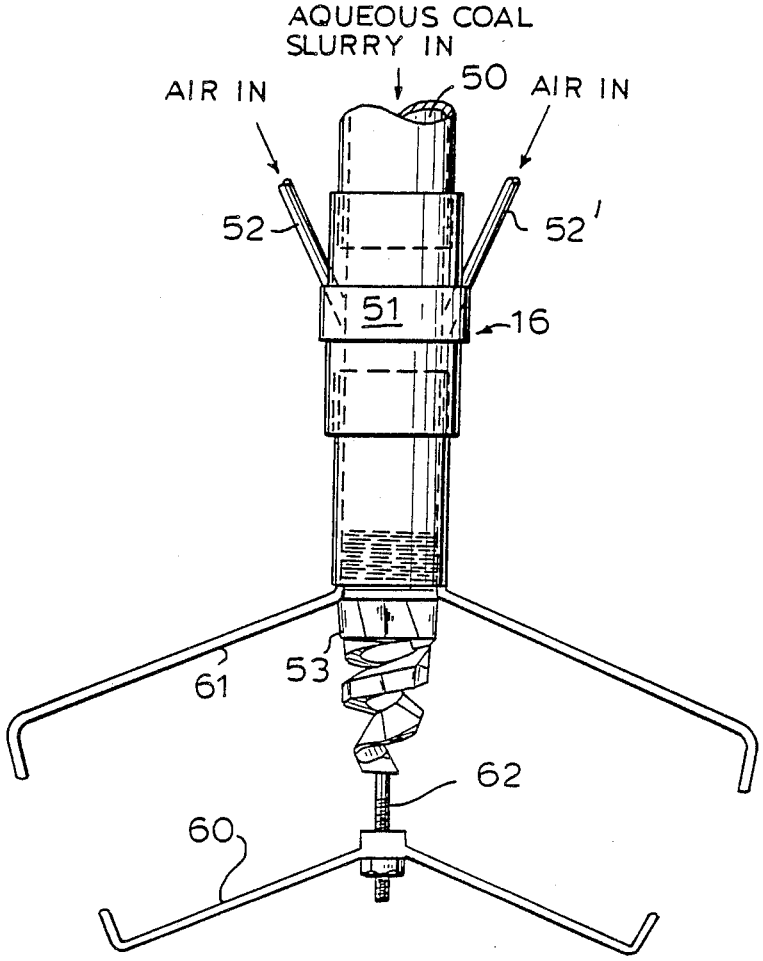

As shown in FIG. 2 in which a preferred type of nozzle-equipped spray apparatus 16 is utilized in the coal beneficiation procedure illustrated in FIG. 1, an aqueous coal slurry is introduced to inlet 50 of the apparatus under a first pressure, e.g., from about 4 to about 25, and preferably from about 5 to about 18, psi and enters gas-injection zone 51 where it combines with air or other gas introduced through jet injectors 52 and 52' at a higher second pressure, e.g., one which is from about 2 to about 15, and preferably from about 3 to about 10, psi higher than the first pressure. Jet injectors 52 and 52' are advantageously equidistantly spaced and at an angle relative to the major axis of the air-entraining zone. So, for example, in the case of two injectors as shown, they are positioned 180° apart and 24° off the centerline of air-entraining zone 51 with passage of the aqueous coal slurry being tangential thereto. The back pressure resulting from the introduction of air into the slurry is generally of modest magnitude and can range from about 2 to about 6, and preferably from about 3 to about 5, psi at the discharge of the spray apparatus. The air streams split the slurry with the result that the slurry picks up and incorporates air. The air-containing slurry is then discharged from the unit at nozzle 53 as concentric spray cones which are directed against first deflecting surface 60 which is separated from second deflecting surface 61 by any suitable means, e.g., shaft 62, preferably one permitting an adjustment in the distance between the two deflecting surfaces to meet different circumstances.

Due to volumetric limitations of a given size plant and the known control of spray pressure required for optimum flotation, should the flow stream of the slurry be reduced for mechanical reasons, air pressure increase/decrease as required will also allow control of spray pressure.

Nozzle 53 of the spray apparatus herein can assume a variety of configurations. A preferred embodiment is shown and represents the open spiral-type nozzle of McGarry et al. U.S. Pat. No. 4,524,291 and copending McGarry et al. U.S. patent application Ser. No. 707,664 filed Mar. 4, 1985, the disclosures of which are incorporated by reference herein.

The various angles of first and second deflecting surfaces 60 and 61 relative to the central axis of the spray discharge incident thereon as well as the distance of the second deflecting surface from the first can vary widely.

In determining the deflecting angles and deflecting plate distance for a given froth flotation operation, it is generally desirable to reduce the initially high velocity of the spray as it emerges from the nozzle to a lower velocity prior to contact of the spray with the surface of the liquid in the flotation tank such that the lower velocity will result in the largest number of particles capturing and retaining bubbles and therefore rising to the surface of the flotation vessel as froth. Excessive spray velocities should be avoided as the resulting high forward momentum of the particles will tend to separate them from their associated bubbles with the result that these particles might travel to and remain at the bottom of the flotation vessel along with the impurities from which they cannot be readily or economically recovered. With these considerations as a guide and with simple and routine testing, it is possible to provide a spray apparatus providing an optimum reduction in the velocity of a spray of a given character so as to maximize the amount of recovered, cleaned particles of coal or other material being processed.

While a preferred embodiment and several variations of the present invention are described in detail herein, it should be apparent that the disclosure and teachings of the present invention will suggest many alternative designs to those skilled in the art.

What is claimed is:

1. A spray apparatus which comprises:

(a) a nozzle through which a liquid-solid slurry is discharged under pressure;

(b) a first surface for intercepting and initially deflecting the path of nozzle discharge incident thereon; and, (c) a second surface for intercepting and redeflecting initially deflected nozzle discharge incident thereon.

2. The spray apparatus of claim 1 which further comprises:

(d) a gas injecting zone for receiving liquid-solid slurry under a first positive pressure and a gas under a higher second positive pressure, at least a portion of the gas entering into and combining with the liquid-solid slurry prior to discharge from the zone through the nozzle.

3. The spray apparatus of claim 2 wherein the nozzle is an open nozzle.

4. In an apparatus for froth flotation separation of the components of a slurry having particulate matter therein, said apparatus including a flotation tank, a spray means for directing a spray of slurry at the surface of liquid within the flotation tank forming a froth thereon and means for removing froth from the flotation tank, wherein the improvement comprises a spray apparatus in accordance with claim 3.

5. In an apparatus for froth flotation separation of the components of a slurry having particulate matter therein, said apparatus including a flotation tank, a spray means for directing a spray of slurry at the surface of liquid within the flotation tank forming a froth thereon and means for removing froth from the flotation tank, wherein the improvement comprises a spray apparatus in accordance with claim 3.

6. The spray apparatus of claim 1 wherein the nozzle is an open nozzle.

7. In an apparatus for froth flotation separation of the components of a slurry having particulate matter therein, said apparatus including a flotation tank, a spray means for directing a spray of slurry at the surface of liquid within the flotation tank forming a froth thereon and means for removing froth from the flotation tank, wherein the improvement comprises a spray apparatus in accordance with claim 6.

8. In an apparatus for froth flotation separation of the components of a slurry having particulate matter therein, said apparatus including a flotation tank, a spray means for directing a spray of slurry at the surface of liquid within the flotation tank forming a froth thereon and means for removing froth from the flotation tank, wherein the improvement comprises a spray apparatus in accordance with claim 1.

9. A method for the froth flotation separation of the components of a liquid-solid slurry which comprises:

(a) discharging a liquid-solid slurry under pressure through a nozzle upon the surface of a liquid forming a froth thereon, said nozzle being provided with a first surface for intercepting and initially deflecting the path of nozzle discharge incident thereon and a second surface for intercepting and redeflecting initially deflected nozzle discharge incident thereon whereby the velocity of the nozzle discharge is significantly reduced; and, (b) removing froth from the liquid surface.

10. The froth flotation method of claim 9 wherein prior to discharge of liquid-solid slurry in step (a), the method further comprises:

(c) introducing liquid-solid slurry to a gas injecting zone under a first positive pressure; and, (d) introducing a gas under a higher second positive pressure into liquid-solid slurry present in the gas injecting zone whereby at least a portion of the gas enters into and combines with the liquid-solid slurry in said zone.

11. The froth flotation method of claim 10 wherein the liquid-solid slurry is water-containing coal particulate, the gas is air and the liquid is water.

12. The froth flotation method of claim 11 wherein the coal to water ratio is from about 1:25 to about 1:2 parts by weight.

13. The froth flotation method of claim 12 wherein from about 80% of the coal particles are of −200 mesh in size (Taylor Standard Screen Size).

14. The froth flotation of claim 11 wherein the particle size of the coal is from about −10 to about 500 mesh.

15. The froth flotation method of claim 11 wherein the coal slurry is admixed in an aqueous medium with a surface treating mixture comprising a polymerizable monomer, a polymerization catalyst and a liquid organic carrier, thereby rendering said coal hydrophobic and oleophilic.

16. The froth flotation method of claim 11 wherein the coal slurry is sprayed upon the surface of the water through an open spiral nozzle.

17. The froth flotation method of claim 9 wherein the liquid-solid slurry is water-containing coal particulate.

18. The froth flotation of claim 17 wherein the particle size of the coal is from about −10 to about 500 mesh.

19. The froth flotation method of claim 18 wherein from about 80% of the coal particles are of −200 mesh in size (Taylor Standard Screen Size).

20. The froth flotation method of claim 17 wherein the coal to water ratio is from about 1:25 to about 1:2 parts by weight.

21. The froth flotation method of claim 17 wherein the coal slurry is admixed in an aqueous medium with a surface treating mixture comprising a polymerizable monomer, a polymerization catalyst and a liquid organic carrier, thereby rendering said coal hydrophobic and oleophilic.

22. The froth flotation method of claim 17 wherein the coal slurry is sprayed upon the surface of the water through an open spiral nozzle.

* * * * *